US012109819B2

(12) United States Patent
Misawa

(10) Patent No.: US 12,109,819 B2
(45) Date of Patent: Oct. 8, 2024

(54) LIQUID EJECTING APPARATUS

(71) Applicant: SEIKO EPSON CORPORATION, Tokyo (JP)

(72) Inventor: Yuji Misawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 17/936,032

(22) Filed: Sep. 28, 2022

(65) Prior Publication Data

US 2023/0094884 A1 Mar. 30, 2023

(30) Foreign Application Priority Data

Sep. 30, 2021 (JP) ................................ 2021-160627
Mar. 22, 2022 (JP) ................................ 2022-045438

(51) Int. Cl.
*B41J 2/165* (2006.01)

(52) U.S. Cl.
CPC ....... *B41J 2/16544* (2013.01); *B41J 2/16523* (2013.01)

(58) Field of Classification Search
CPC .......................... B41J 2/16544; B41J 2/16523
See application file for complete search history.

(56) References Cited

FOREIGN PATENT DOCUMENTS

JP 2007069579 A * 3/2007 .......... B41J 2/16552
JP 2016-175275 A 10/2016

* cited by examiner

*Primary Examiner* — Justin Seo
(74) *Attorney, Agent, or Firm* — WORKMAN NYDEGGER

(57) ABSTRACT

A liquid ejecting apparatus includes a liquid ejecting head ejecting a liquid to a medium, a wiping mechanism wiping a liquid ejection surface of the liquid ejecting head and including a wiper portion that wipes the liquid ejection surface by moving in a direction along the liquid ejection surface, an electric portion including a substrate, the electronic portion being a part related to control of the apparatus, and a power supply portion as a power supply source, in which a moving direction of the wiper portion is a direction intersecting a surface of the substrate, and at least part of the electric portion and at least part of the power supply portion overlap part of the wiping mechanism in the moving direction of the wiper portion.

14 Claims, 11 Drawing Sheets

LIQUID EJECTING APPARATUS

The present application is based on, and claims priority from JP Application Serial Number 2021-160627, filed Sep. 30, 2021 and JP Application Serial Number 2022-045438, filed Mar. 22, 2022, the disclosures of which are hereby incorporated by reference herein in their entirety.

BACKGROUND

1. Technical Field

The present disclosure relates to a liquid ejecting apparatus ejecting a liquid to a medium.

2. Related Art

An ink jet printer as an example of a liquid ejecting apparatus includes a wiping mechanism that wipes an ink ejection surface of an ink ejecting head. In the ink jet printer disclosed in JP-A-2016-175275, a wiper is referred to as a wiping member, and the wiping member is provided in a wiping unit. The wiping unit moves in a direction along the ink ejection surface of the ink ejecting head by obtaining power of a motor, and wipes the ink ejection surface of the ink ejecting head in a process of moving the wiping unit.

A cover is provided on a back surface of the ink jet printer, and the wiping member can be accessed by opening the cover. The wiping member is fixed to the wiping unit using screws, and the wiping member can be taken out of the liquid ejecting apparatus by removing the screws.

In a configuration in which the wiping member moves in the direction along the ink ejection surface of the ink ejecting head as described above, it is also required to secure a moving region of the wiping member outside an ink ejection region, and therefore, a size of the liquid ejecting apparatus is likely to increase in the moving direction of the wiping member.

SUMMARY

A liquid ejecting apparatus according to the present disclosure includes a liquid ejecting head ejecting a liquid to a medium, a wiping mechanism wiping a liquid ejection surface of the liquid ejecting head and including a wiper portion that wipes the liquid ejection surface by moving in a direction along the liquid ejection surface, an electric portion including a substrate, the electric portion being a part related to control of the apparatus, and a power supply portion as a power supply source. A moving direction of the wiper portion is a direction intersecting a surface of the substrate, at least part of the electric portion overlaps at least part of the power supply portion in the moving direction of the wiper portion, and the at least part of the electric portion and the at least part of the power supply portion overlap part of the wiping mechanism in the moving direction of the wiper portion.

DESCRIPTION OF EXEMPLARY EMBODIMENTS

Figure 1:
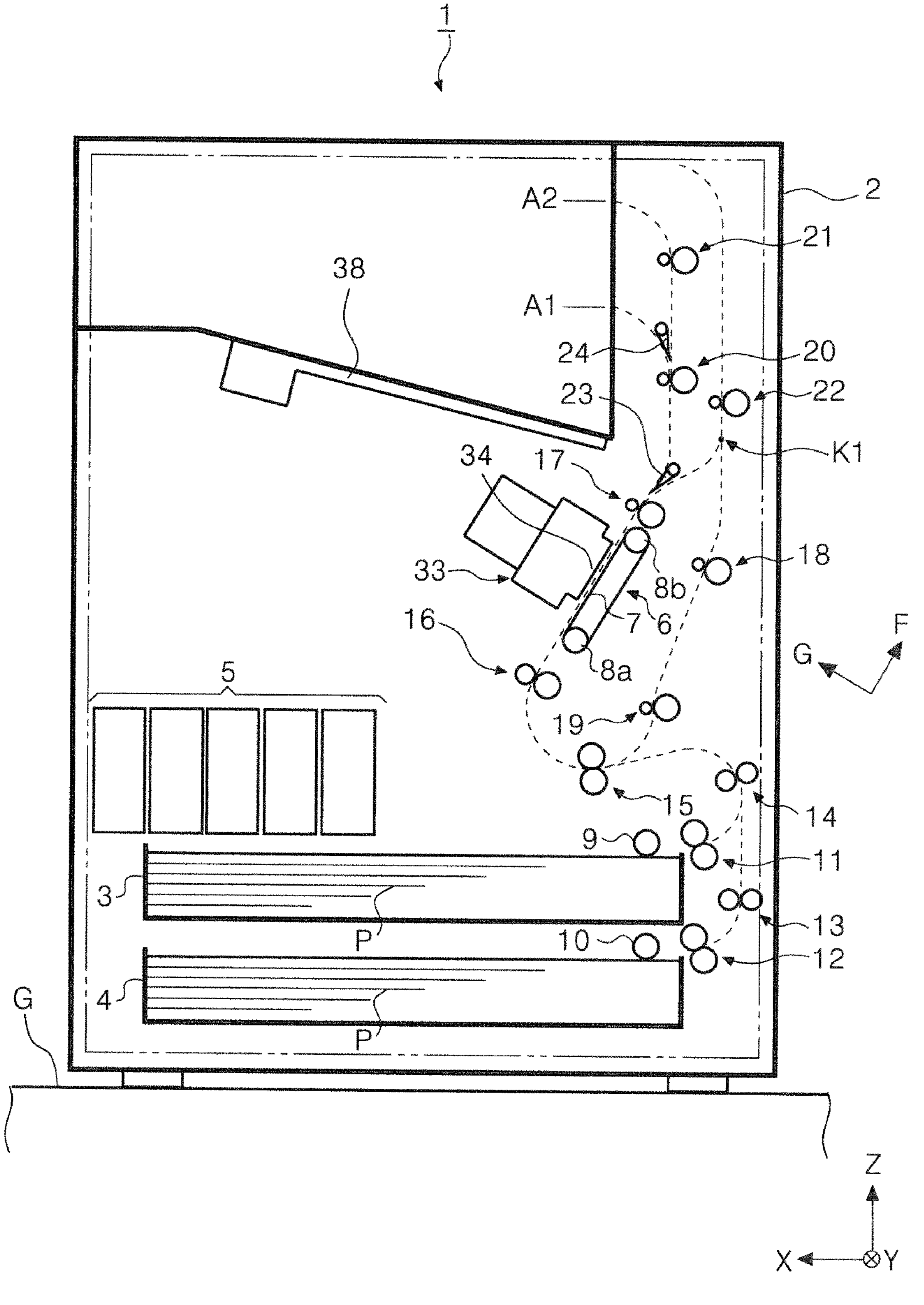
FIG. 1 is a diagram illustrating a medium transport path of a printer.

Hereinafter, the present disclosure will be schematically described.

According to a first aspect, a liquid ejecting apparatus includes a liquid ejecting head ejecting a liquid to a medium, a wiping mechanism wiping a liquid ejection surface of the liquid ejecting head and including a wiper portion that wipes the liquid ejection surface by moving in a direction along the liquid ejection surface, an electric portion including a substrate, the electric portion being a part related to control of the apparatus, and a power supply portion as a power supply source. A moving direction of the wiper portion is a direction intersecting a surface of the substrate, at least part of the electric portion overlaps at least part of the power supply portion in the moving direction of the wiper portion, and the at least part of the electric portion and the at least part of the power supply portion overlap part of the wiping mechanism in the moving direction of the wiper portion.

According to the aspect, since at least part of the electric portion overlaps at least part of the power supply portion, and at least part of the electric portion and at least part of the power supply portion overlap the part of the wiping mechanism in the moving direction of the wiper portion, a dimension of the apparatus in the moving direction of the wiper portion can be suppressed, and a size of the apparatus can be reduced.

According to a second aspect, in the first aspect, the wiper portion is configured to move to a home position and a wiping region where the liquid ejection surface is wiped, and when the wiper portion is located at the home position, the at least part of the electric portion overlaps at least part of the wiper portion in the moving direction of the wiper portion, the at least part of the power supply portion overlaps the at least part of the wiper portion in the moving direction of the wiper portion, or the at least part of the electric portion and the at least part of the power supply portion overlap the at least part of the wiper portion in the moving direction of the wiper portion.

According to the aspect, an effect in the first aspect can be obtained from a configuration in which when the wiper portion is located at the home position, at least part of the electric portion overlaps at least part of the wiper portion in the moving direction of the wiper portion, at least part of the power supply portion overlaps at least part of the wiper portion in the moving direction of the wiper portion, or at least part of the electric portion and at least part of the power supply portion overlap at least part of the wiper portion in the moving direction of the wiper portion.

According to a third aspect, in the first or second aspect, the moving direction of the wiper portion is an apparatus depth direction.

According to the aspect, since the moving direction of the wiper portion is the apparatus depth direction, the dimension of the apparatus in the apparatus depth direction can be suppressed.

According to a fourth aspect, in the third aspect, a back cover forming a back surface of the apparatus is configured to be attached to/detached from or opened/closed with respect to an apparatus main body, and the electric portion and the power supply portion are exposed by removing or opening the back cover.

According to the aspect, since the back cover forming the back surface of the apparatus is configured to be attached to/detached from or opened/closed with respect to the apparatus main body, and the electric portion and the power supply portion are exposed by removing or opening the back cover, maintainability of the electric portion and the power supply portion is improved.

According to a fifth aspect, in the fourth aspect, the electric portion and the power supply portion are configured to be opened/closed with respect to the apparatus main body.

According to the aspect, since the electric portion and the power supply portion are configured to be opened/closed with respect to the apparatus main body, a storage space for the electric portion or the power supply portion is not required during a maintenance operation in comparison to a configuration in which the electric portion or the power supply portion is removed, such that an operation efficiency for the maintenance is improved.

According to a sixth aspect, in any one of the first to fifth aspects, the liquid ejecting apparatus further includes a transport belt transporting the medium and provided at a position facing the liquid ejecting head, and a high-voltage portion handling a higher voltage than the electric portion, the high-voltage portion being a part for controlling charging of the transport belt, in which at least part of the high-voltage portion overlaps the part of the wiping mechanism in the moving direction of the wiper portion.

According to the aspect, since at least part of the high-voltage portion overlaps the part of the wiping mechanism in the moving direction of the wiper portion, the dimension of the apparatus in the moving direction of the wiper portion can be suppressed, and the size of the apparatus can be reduced.

According to a seventh aspect, in any one of the first to sixth aspects, the electric portion includes a communication portion for communicating with an external device.

According to the aspect, an effect in any one of the first to sixth aspects can be obtained from a configuration in which the electric portion includes the communication portion for communicating with the external device.

According to an eighth aspect, in any one of the first to seventh aspects, the liquid ejecting apparatus further includes a wiper drive motor as a power source for moving the wiper portion, in which when viewed from the moving direction of the wiper portion, a cutout portion is formed in the electric portion, and the wiper drive motor is disposed on the cutout portion.

According to the aspect, since when viewed from the moving direction of the wiper portion, the cutout portion is formed in the electric portion, and the wiper drive motor is disposed on the cutout portion, an increase in size of the apparatus in accordance with installation of the wiper drive motor can be suppressed.

According to a ninth aspect, in any one of the first to eighth aspects, the liquid ejecting apparatus further includes a transport unit transporting the medium, and a waste liquid collecting portion collecting a waste liquid ejected from the liquid ejecting head.

According to the aspect, an effect in any one of the first to eighth aspects can be obtained from a configuration including the transport unit transporting the medium and the waste liquid collecting portion collecting the waste liquid ejected from the liquid ejecting head.

According to a tenth aspect, in the ninth aspect, at least part of the transport unit overlaps at least part of the waste liquid collecting portion in the moving direction of the wiper portion.

According to the aspect, since at least part of the transport unit overlaps at least part of the waste liquid collecting portion in the moving direction of the wiper portion, the dimension of the apparatus in the moving direction of the wiper portion can be suppressed, and the size of the apparatus can be reduced.

According to an eleventh aspect, in the ninth or tenth aspect, the liquid ejecting apparatus further includes a mounting portion on which a liquid container for accommodating the liquid supplied to the liquid ejecting head is configured to be mounted, in which an entirety of the mounting portion and an entirety of the waste liquid collecting portion are within an area of the transport unit in the moving direction of the wiper portion.

According to the aspect, since the entirety of the mounting portion and the entirety of the waste liquid collecting portion are within the area of the transport unit in the moving direction of the wiper portion, the dimension of the apparatus in the moving direction of the wiper portion can be suppressed, and the size of the apparatus can be reduced.

According to a twelfth aspect, in the ninth or tenth aspect, the liquid ejecting apparatus further includes a liquid supply unit supplying the liquid to the liquid ejecting head, in which the liquid supply unit includes a mounting portion on which a liquid container for accommodating the liquid supplied to the liquid ejecting head is configured to be mounted, and a liquid storing portion storing the liquid supplied from the liquid container, the liquid storing portion being a part located between the liquid container and the liquid ejecting head in a flow channel of the liquid, at least part of the liquid supply unit and at least part of the waste liquid collecting portion overlap at least part of the transport unit in the moving direction of the wiper portion, and the liquid supply unit and the waste liquid collecting portion are arranged along the moving direction of the wiper portion.

According to the aspect, since at least part of the liquid supply unit and at least part of the waste liquid collecting portion overlap at least part of the transport unit in the moving direction of the wiper portion, the dimension of the apparatus in the moving direction of the wiper portion can be suppressed, and the size of the apparatus can be reduced.

In addition, since the liquid supply unit and the waste liquid collecting portion are arranged along the moving direction of the wiper portion, the dimension of the apparatus in the direction intersecting the moving direction of the wiper portion can be suppressed, and the size of the apparatus can be reduced.

According to a thirteenth aspect, in any one of the ninth to twelfth aspects, the liquid ejecting apparatus further includes a pair of frames supporting the transport unit and disposed to face each other in the moving direction of the wiper portion with the transport unit interposed between the pair of frames, in which an entirety of the waste liquid collecting portion is provided inside the pair of frames.

According to the aspect, since the entirety of the waste liquid collecting portion is provided inside the pair of frames, it is not necessary to provide a hole passing through the waste liquid collecting portion in the pair of frames, such that deterioration in rigidity of the pair of frames can be prevented.

According to a fourteenth aspect, in any one of the first to eighth aspects, the liquid ejecting apparatus further includes a transport unit transporting the medium, and a liquid supply unit supplying the liquid to the liquid ejecting head, in which the liquid supply unit includes a mounting portion on which a liquid container for accommodating the liquid supplied to the liquid ejecting head is configured to be mounted, and a liquid storing portion storing the liquid supplied from the liquid container, the liquid storing portion being a part located between the liquid container and the liquid ejecting head in a flow channel of the liquid, and at least part of the transport unit overlaps at least part of the liquid supply unit in the moving direction of the wiper portion.

According to the aspect, since at least part of the transport unit overlaps at least part of the liquid supply unit in the moving direction of the wiper portion, the dimension of the apparatus in the moving direction of the wiper portion can be suppressed, and the size of the apparatus can be reduced.

Hereinafter, the present disclosure will be described in detail.

An ink jet printer 1 that ejects a liquid represented by ink and performs recording on a medium represented by recording paper will be described by way of example of the liquid ejecting apparatus. Hereinafter, the ink jet printer 1 is simply referred to as a printer 1.

In each drawing, an X-Y-Z coordinate system is an orthogonal coordinate system, in which a Y-axis direction represents a width direction intersecting a transport direction of a medium, an apparatus depth direction, and a moving direction of a wiper portion 41 to be described later. In the Y-axis direction, a +Y direction, which is a direction indicated by an arrow in the Y-axis direction, represents a direction from the front of the apparatus toward the back of the apparatus, and a −Y direction opposite to the +Y direction represents a direction from the back of the apparatus toward the front of the apparatus.

An X-axis direction represents an apparatus width direction, in which a +X direction, which is a direction indicated by an arrow, represents the left side, and a −X direction opposite to the +X direction represents the right side, when viewed from an operator of the printer 1. A Z-axis direction represents a vertical direction, that is, an apparatus height direction, in which a +Z direction, which is a direction indicated by an arrow, represents an upward direction, and a −Z direction opposite to the +Z direction represents a downward direction. Hereinafter, when used herein, a term “upper” means the +Z direction, and a term “lower” means the −Z direction.

A G-axis direction represents a normal direction with respect to an ink ejection surface 35 of a line head 34 which will be described later, in which a +G direction, which is a direction indicated by an arrow, represents a direction in which a head unit 33 (described later) is separated from a transport belt 7, and a −G direction opposite to the +G direction represents a direction in which the head unit 33 approaches the transport belt 7.

An F-axis direction, which is a direction in parallel to the ink ejection surface 35, represents a medium transport direction at a position facing the ink ejection surface 35, in which a +F direction, which is a direction indicated by an arrow, represents a downstream of the transport direction, and a −F direction opposite to the +F direction represents an upstream of the transport direction. Hereinafter, a direction in which the medium is sent may be referred to as a “downstream”, and a direction opposite to the direction in which the medium P is sent may be referred to as an “upstream”. The F-axis direction represents a moving direction of a cap carriage 31 to be described later.

In some of the drawing, an F-G-Y coordinate system is used instead of the X-Y-Z coordinate system.

In FIG. 1, a medium transport path is indicated by a broken line. A medium in the printer 1 is transported through the medium transport path indicated by the broken line.

An apparatus main body 2 of the printer 1 includes a first medium cassette 3 and a second medium cassette 4 for accommodating the medium before feeding. Reference symbol P represents a medium accommodated in each medium cassette. The first medium cassette 3 and the second medium cassette 4 are provided on the apparatus main body 2 so as to be attachable to/detachable from an apparatus front side.

The first medium cassette 3 is provided with a pick roller 9 for sending out the accommodated medium, and the second medium cassette 4 is provided with a pick roller 10 for sending out the accommodated medium.

The first medium cassette 3 is provided with a pair of feeding rollers 11 for feeding the sent-out medium in an obliquely upward direction. The second medium cassette 4 is provided with a pair of feeding rollers 12 for feeding the sent-out medium in the obliquely upward direction, and a pair of transport rollers 13 for transporting the medium in an upward direction.

The term “pair of rollers” herein refers to a pair of rollers including a drive roller that is driven by a motor (not illustrated) and a driven roller that is driven to rotate in contact with the drive roller, unless otherwise described.

The medium sent out from each medium cassette is sent to a pair of transport rollers 16 by a pair of transport rollers 14 and a pair of transport rollers 15. The medium receiving a sending force from the pair of the transport rollers 16 is sent to a position between the line head 34 and the transport belt 7, that is, a position facing the line head 34.

The line head 34 ejects ink to a surface of the medium and performs recording. The line head 34 is an ink ejecting head that is configured such that nozzles (not illustrated) ejecting the ink cover the entire region in a medium width direction, and is configured as an ink ejecting head capable of performing recording on the entire width of the medium without moving in the medium width direction. The line head 34 is an example of a liquid ejecting head ejecting the liquid.

Reference numeral 5 represents an ink accommodating portion accommodating the ink. The ink ejected from the line head 34 is supplied from the ink accommodating portion 5 to the line head 34 through a tube (not illustrated). The ink accommodating portion 5 includes a plurality of ink tanks disposed in the X-axis direction.

The transport belt 7 and pulleys **8*a* and 8*b* constitute a belt unit 6. The transport belt 7 is an endless belt that is wound around the pulley 8*a* and the pulley 8*b* disposed in the medium transport direction. The transport belt 7 rotates by driving at least one of the pulley 8***a* and the pulley 8*b* by a motor (not illustrated).

The medium is transported to a position facing the line head 34 while clinging to a surface of the transport belt 7.

The transport belt 7 is an endless belt formed of a conductive material that is contained in a base material, such as urethane or rubber, and is applied with a predetermined tension by a tensioner (not illustrated).

A charging roller (not illustrated) is provided at a position facing the pulley 8*a* with the transport belt 7 interposed between the pulley 8*a* and the charging roller. The charging roller is in contact with an outer surface of the transport belt 7, and is driven to rotate in accordance with the rotation of the transport belt 7. A direct current is applied from a high-voltage unit 70 (see FIG. 4) to the charging roller, and accordingly, the charging roller supplies a charge to a part in contact with the transport belt 7. For example, the charging roller supplies a positive charge to the transport belt 7, and allows the outer surface of the transport belt 7 to be charged to positive polarity. As a result, the outer surface of the transport belt 7 becomes an attraction surface to which the medium clings.

The medium transport path passing through the position facing the line head 34 intersects both the horizontal direction and the vertical direction, and transports the medium in the obliquely upward direction. The obliquely upward transport direction represents a direction including a −X direction component and a +Z direction component in FIG. 1, and with such a configuration, it is possible to suppress a dimension of the printer 1 in the horizontal direction.

In the present embodiment, the medium transport path passing through the position facing the line head 34 is set to have an inclination angle within a range of 50° to 70°, and more specifically, an inclination angle of 60°.

The medium with a first surface on which recoding is performed by the line head 34 is sent in a more obliquely upward direction by a pair of transport rollers 17 located on a downstream of the transport belt 7.

A flap 23 is provided on a downstream of the pair of transport rollers 17, and the medium transport direction is changed by the flap 23. When discharging the medium as it is, the medium transport direction is changed toward an upper side of a pair of transport rollers 20 by the flap 23. A flap 24 is further provided on a downstream of the pair of transport rollers 20, the transport path is changed by the flap 24 to either a path to discharge the medium from a discharge position A1 or a path to transport the medium to a pair of transport rollers 21 located further vertically upward. When the medium is sent to the pair of transport rollers 21, the medium is discharged from a discharge position A2.

The medium discharged from the discharge position A1 is received by a discharge tray 38 that is inclined in an obliquely upward direction including the +X direction component and the +Z direction component. The medium discharged from the discharge position A2 is received by an option tray (not illustrated).

When a second surface is further recorded in addition to the first surface of the medium, the medium is sent in the obliquely upward direction including a −X direction component and the +Z direction component by the flap 23, passes through a branching position K1, and is sent to a switch back path above the branching position K1. A pair of transport rollers 22 is provided in the switch back path. The medium entering the switch back path is transported in an upward direction by the pair of transport rollers 22, a rear end of the medium passes through the branching position K1, and then a rotating direction of the pair of transport rollers 22 is changed, and the medium is thus transported in a downward direction.

The medium transported in the downward direction by the pair of transport rollers 22 arrives at the pair of transport rollers 16 by receiving the sending force from a pair of transport rollers 18, a pair of transport rollers 19, and the pair of transport rollers 15, and the medium is sent to a position facing the line head 34 again by the pair of transport rollers 16.

In the medium sent to the position facing the line head 34 again, the second surface opposite to the first surface on which the recording has been already performed faces the line head 34. As a result, the second surface of the medium can be recorded by the line head 34. The medium with the second surface on which recording is performed is discharged from the discharge position A1 or the discharge position A2 described above.

Next, relationships between the head unit 33, the cap carriage 31, and the wiper portion 41 will be described with reference to FIG. 2.

Figure 4:
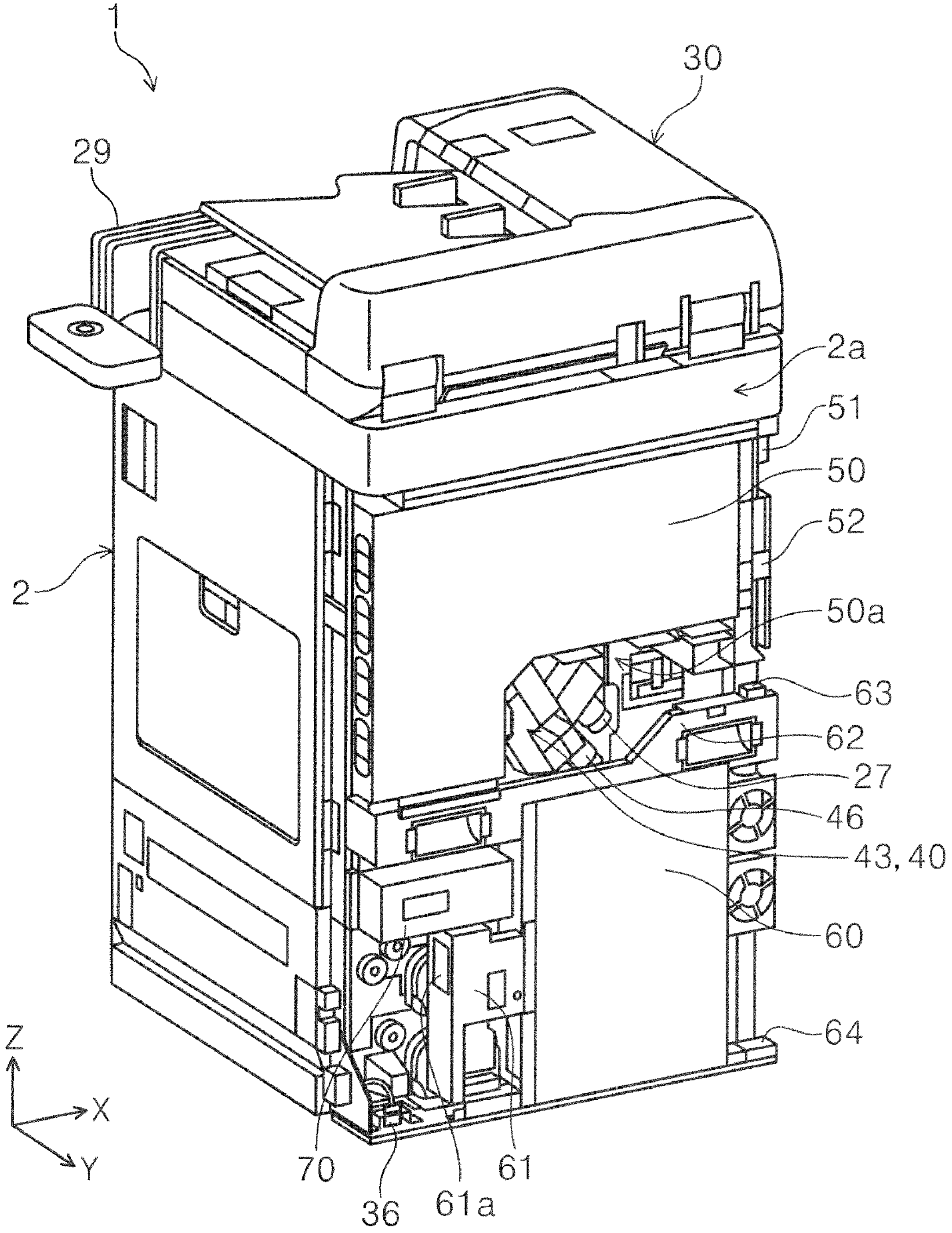
FIG. 4 is a perspective view illustrating a state where a back cover and a side cover are removed from a state in FIG. 3.

The head unit 33 is a unit including the line head 34, and is provided to be driven along the G-axis direction by a head lifting motor 27 (see FIG. 4).

The cap carriage 31, which is an example of a cap unit including a cap 32 covering the line head 34, is provided to be driven along the F-axis direction by a motor (not illustrated).

Figure 5:
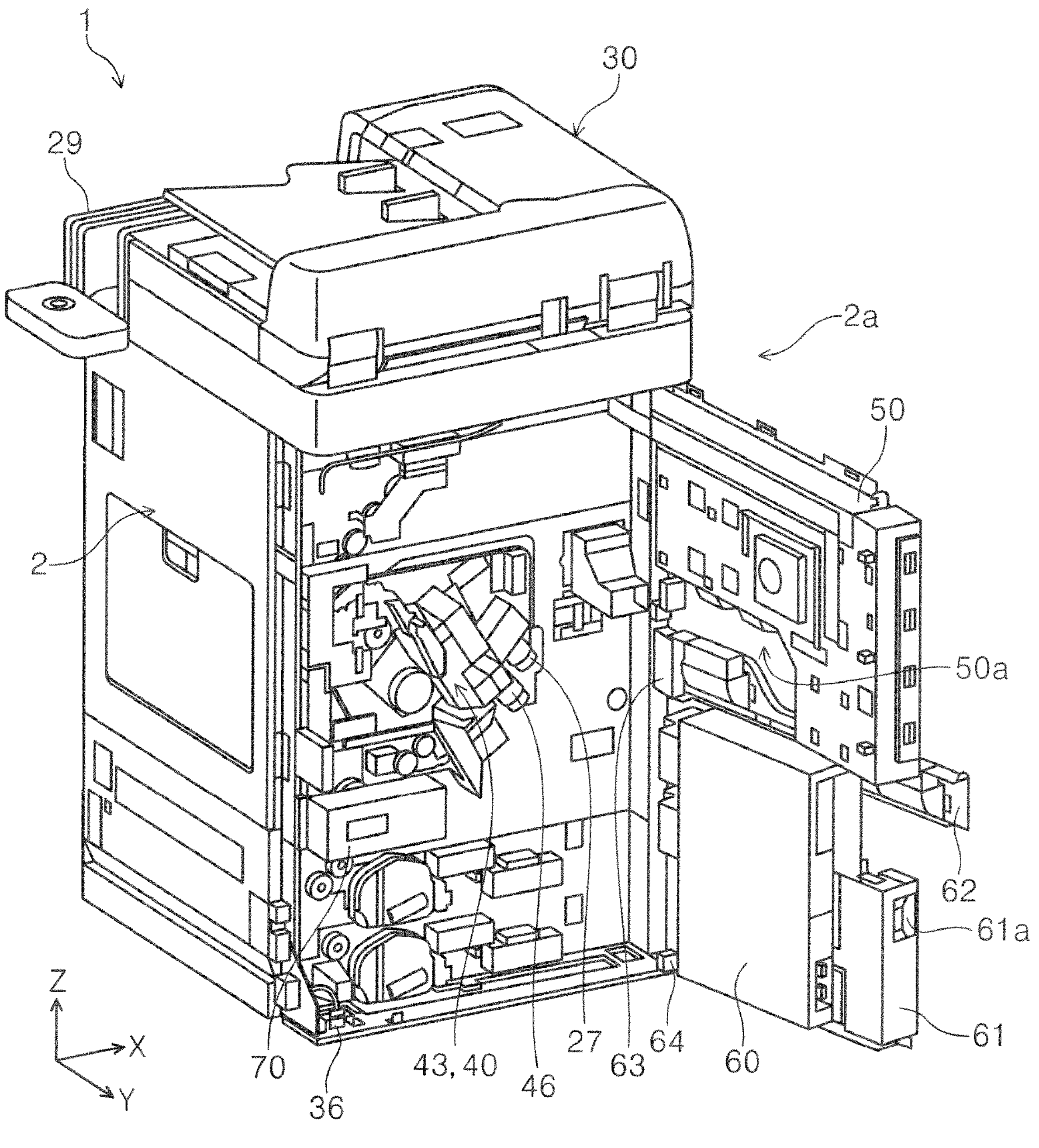
FIG. 5 is a perspective view illustrating a state where an electric unit and a power supply unit are open from the state in FIG. 4.
Figure 6:
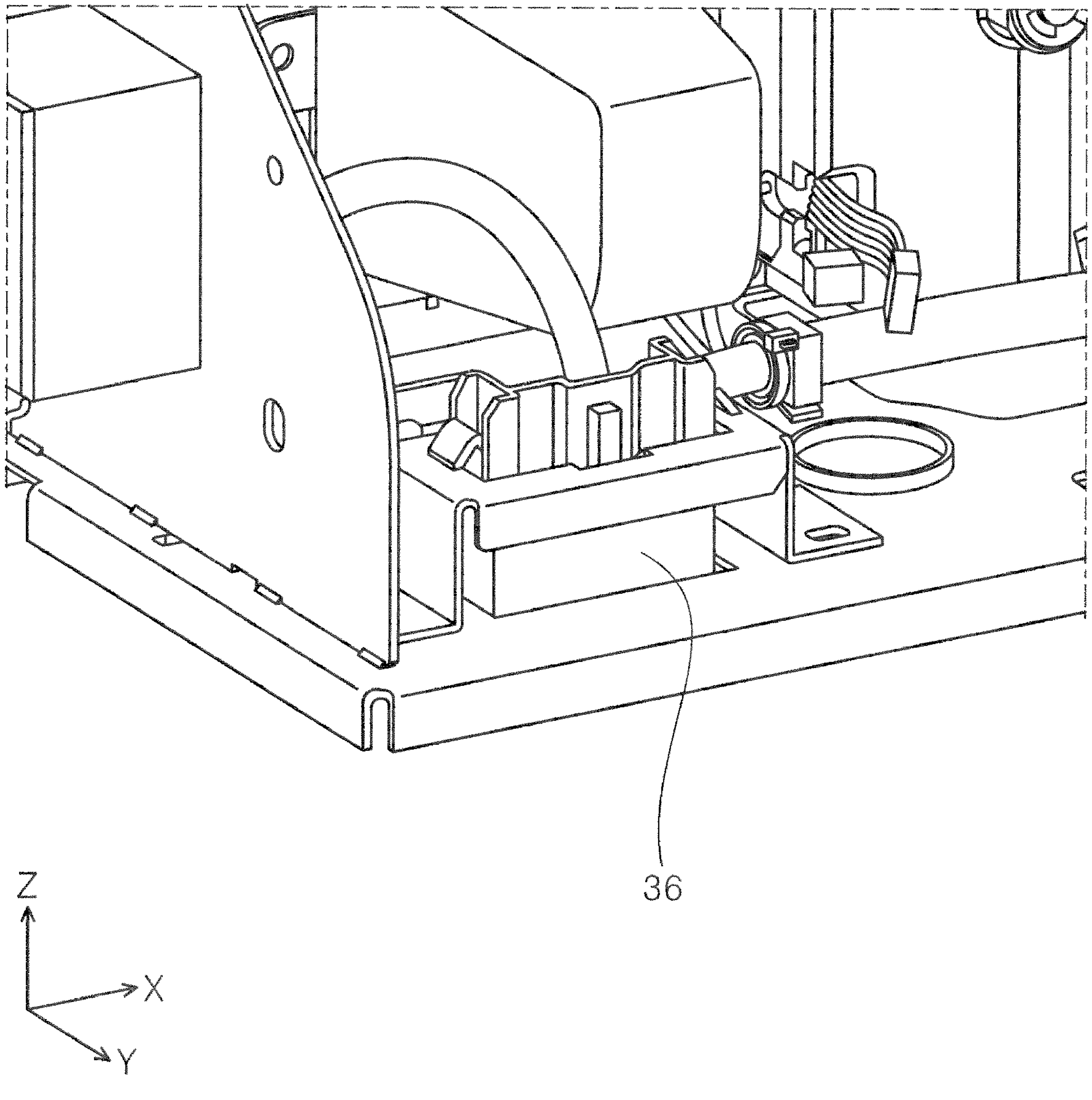
FIG. 6 is a perspective view of a main body coupling portion.

The wiper portion 41 is a unit on which a wiper 42 wiping the ink ejection surface 35 of the line head 34 is provided, and is provided to be movable in the Y-axis direction, which is an example of a direction along the ink ejection surface 35. The wiper portion 41 is provided to be driven along the Y-axis direction by a wiper drive motor 46 (see FIGS. 4 and 5). The wiper portion 41 is located at a home position except during wiping, by setting a position of an end in a movement region in the +Y direction as the home position.

The wiper 42 is formed of an elastic material, such as rubber or elastomer, such that the wiper 42 can be pressed against the ink ejection surface 35 due to elasticity.

As described above, the head unit 33, the cap carriage 31, and the wiper portion 41 are provided to be driven by each motor in directions orthogonal to each other.

Figure 2:
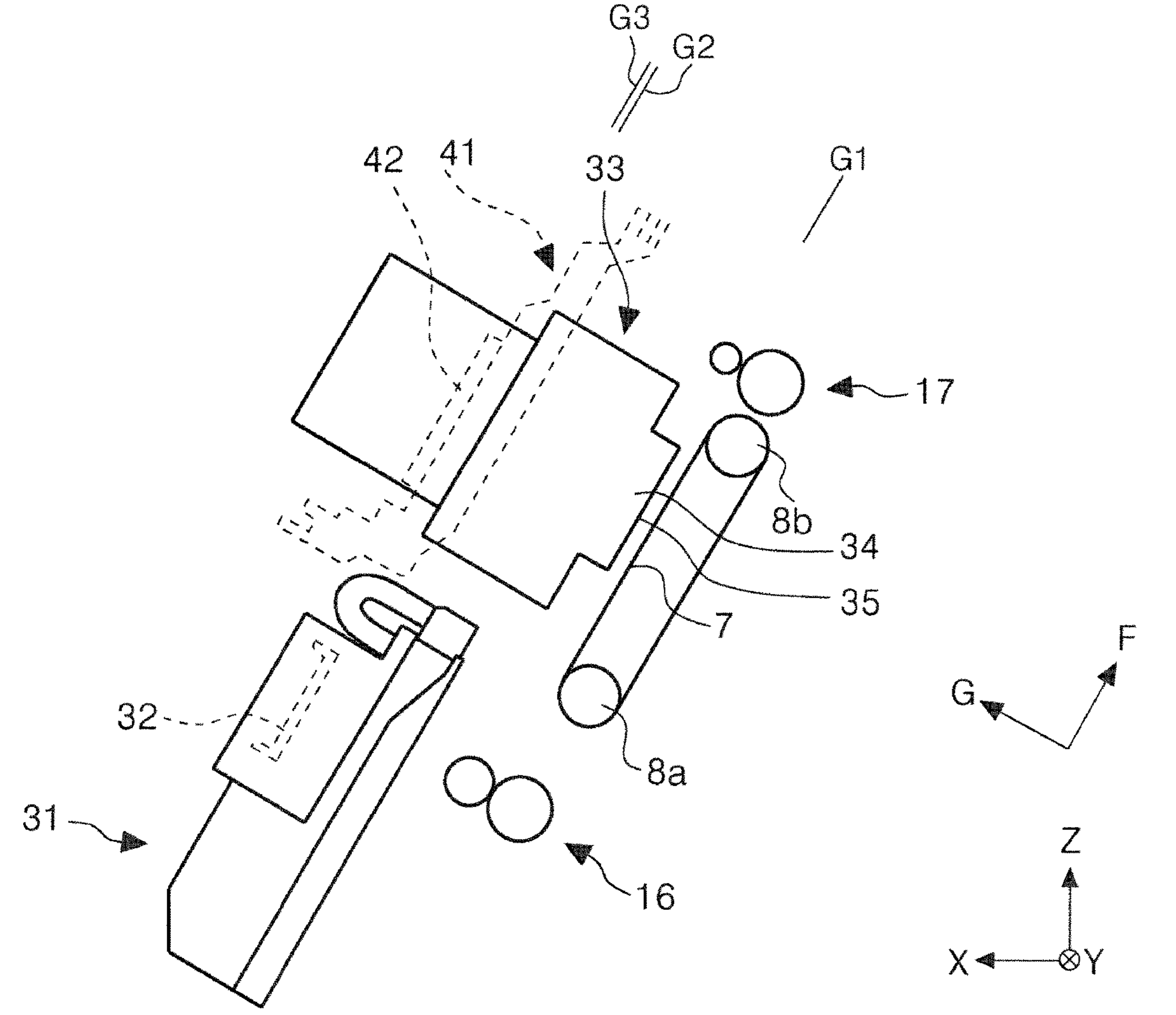
FIG. 2 is a diagram illustrating a positional relationship between a head unit, a cap carriage, and a wiper carriage.

FIG. 2 illustrates a position of each unit when the line head 34 performs recording on the medium. A position G1 is a position of the ink ejection surface 35 in the G-axis direction in a state where the line head 34 performs recording on the medium. In this state, the cap carriage 31 is at a position where the cap carriage 31 is retracted from the head unit 33 in the −F direction, and the wiper portion 41 is located at the home position set in the +Y direction.

When the cap 32 of the cap carriage 31 caps the ink ejection surface 35 from this state, the head unit 33 moves in the +G direction from the position in FIG. 2, and the cap carriage 31 moves in the +F direction. As a result, the ink ejection surface 35 and the cap 32 face each other. Once the ink ejection surface 35 and the cap 32 face each other, the head unit 33 moves in the −G direction, and thus the cap 32 caps the ink ejection surface 35. A position G2 is a position of the ink ejection surface 35 in the G-axis direction when the cap 32 caps the ink ejection surface 35.

When the wiper 42 of the wiper portion 41 wipes the ink ejection surface 35, the head unit 33 moves in the +G direction from the state in FIG. 2. Then, the wiper portion 41 moves from the home position in the +Y direction to the position of the end in the −Y direction. Thereafter, the head unit 33 moves slightly in the −G direction, and the wiper portion 41 moves toward the +Y direction in a state where the ink ejection surface 35 is located at a position G3, the wiper 42 thus wipes the ink ejection surface 35.

A coupling unit 43 (see FIGS. 4 and 7) is disposed at the home position of the wiper portion 41. The coupling unit 43 constitutes a wiping mechanism 40 together with the wiper portion 41. The apparatus main body 2 includes a moving unit (not illustrated) for moving the wiper portion 41 along the Y-axis direction. The moving unit (not illustrated) is composed of, for example, a guide rail.

The coupling unit 43 is provided in a fixed state different from the wiper portion 41. A suction needle (not illustrated) is provided on the coupling unit 43, and when the wiper portion 41 moves to the home position, the suction needle enters a suction hole (not illustrated) on a side of the wiper portion 41. A storage portion (not illustrated) storing the ink is provided in the wiper portion 41. The suction needle communicates with a pump (not illustrated). Therefore, when the wiper portion 41 moves to the home position, the pump can suck and collect the ink accumulated inside the wiper portion 41.

Next, an electric system provided on a back side of the apparatus will be described with reference to FIG. 3 and the drawings thereafter.

Figure 3:
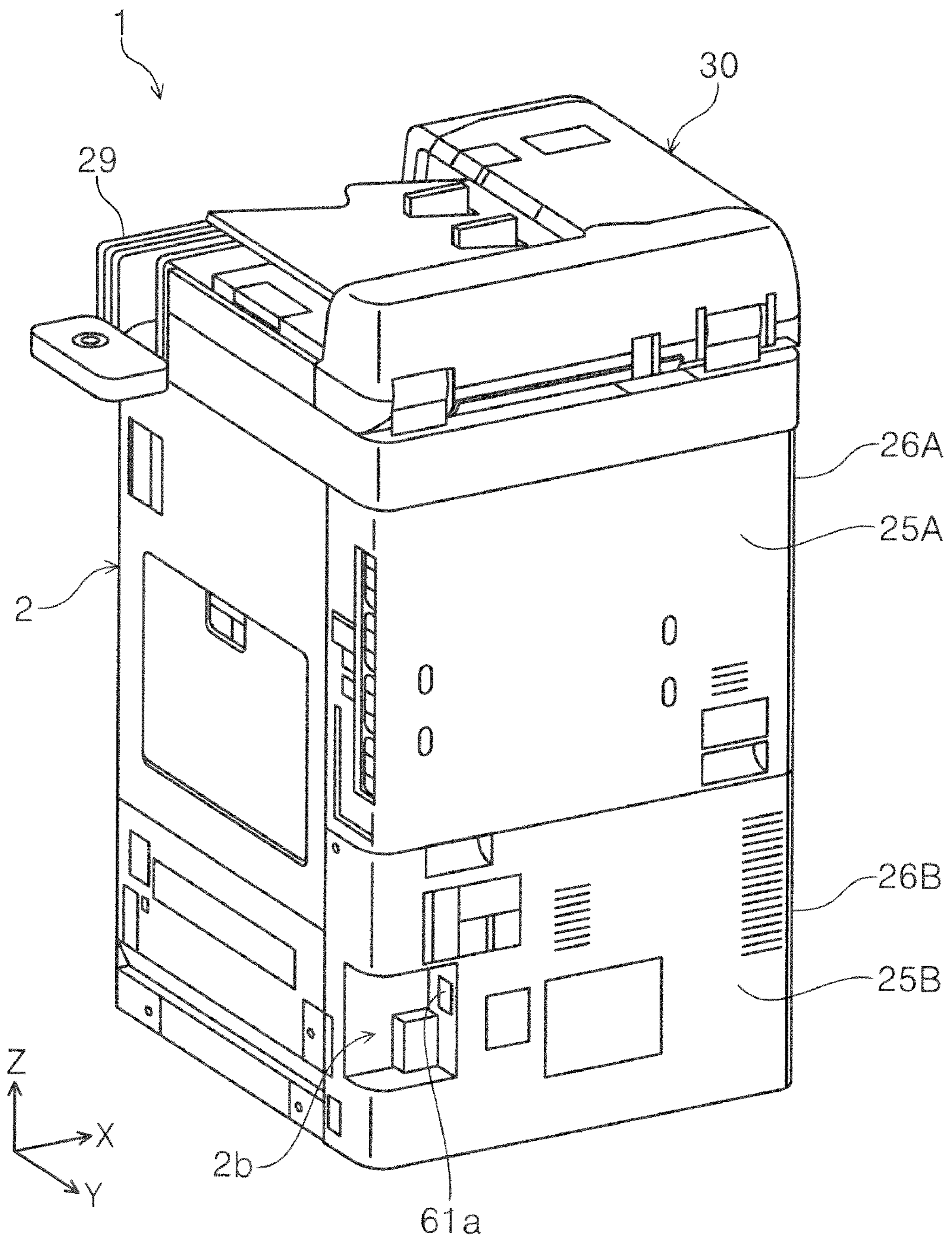
FIG. 3 is a perspective view illustrating a back surface, which is one side of the printer.

A back cover 25A is provided on a back surface, which is one side, of the apparatus main body 2 as illustrated in FIG. 3, and a back cover 25B is provided on a lower side of the back cover 25A.

Further, a side cover 26A is provided on a side, which is one side of the apparatus main body 2, in the +X direction, and a side cover 26B is provided on a lower side of the side cover 26A.

The back covers 25A and 25B and the side covers 26A and 26B are parts of a housing constituting an outer shell of the apparatus main body 2. Reference numeral 30 in FIG. 3 represents a scanner unit provided on an upper portion of the apparatus main body 2, and reference numeral 29 represents an operation panel provided on a front upper portion of the apparatus main body 2.

The back covers 25A and 25B and the side covers 26A and 26B are fixed to the apparatus main body 2 with screws (not illustrated), and the back covers 25A and 25B and the side covers 26A and 26B can be removed from the apparatus main body 2 by removing the screws. That is, the back covers 25A and 25B and the side covers 26A and 26B are provided so as to be attachable to/detachable from the apparatus main body 2.

A recess 2*b* is formed on a lower portion of the back surface of the apparatus main body 2. An inlet 61*a* is provided in the recess 2*b*, and a power supply cable (not illustrated) is coupled to the inlet 61*a*. The inlet 61*a* is provided in a box-shaped inlet unit 61 (see FIG. 4).

Next, FIG. 4 illustrates a state where the back covers 25A and 25B and the side covers 26A and 26B are removed. When the back cover 25A is removed, the electric unit 50 as a part related to control of the apparatus, the coupling unit 43 constituting the wiping mechanism 40, the wiper drive motor 46, and the head lifting motor 27 are exposed. In addition, when the back cover 25B is removed, a power supply unit 60, a high-voltage unit 70, and a main body coupling portion 36 are exposed.

The electric unit 50 is an example of the electric portion including the substrate, as a part related to control of the apparatus. The power supply unit 60 is an example of the power supply portion as a power supply source of the apparatus. The high-voltage unit 70 is an example of a high-voltage portion handling a high voltage, as a part for controlling charging of the transport belt 7.

Figure 7:
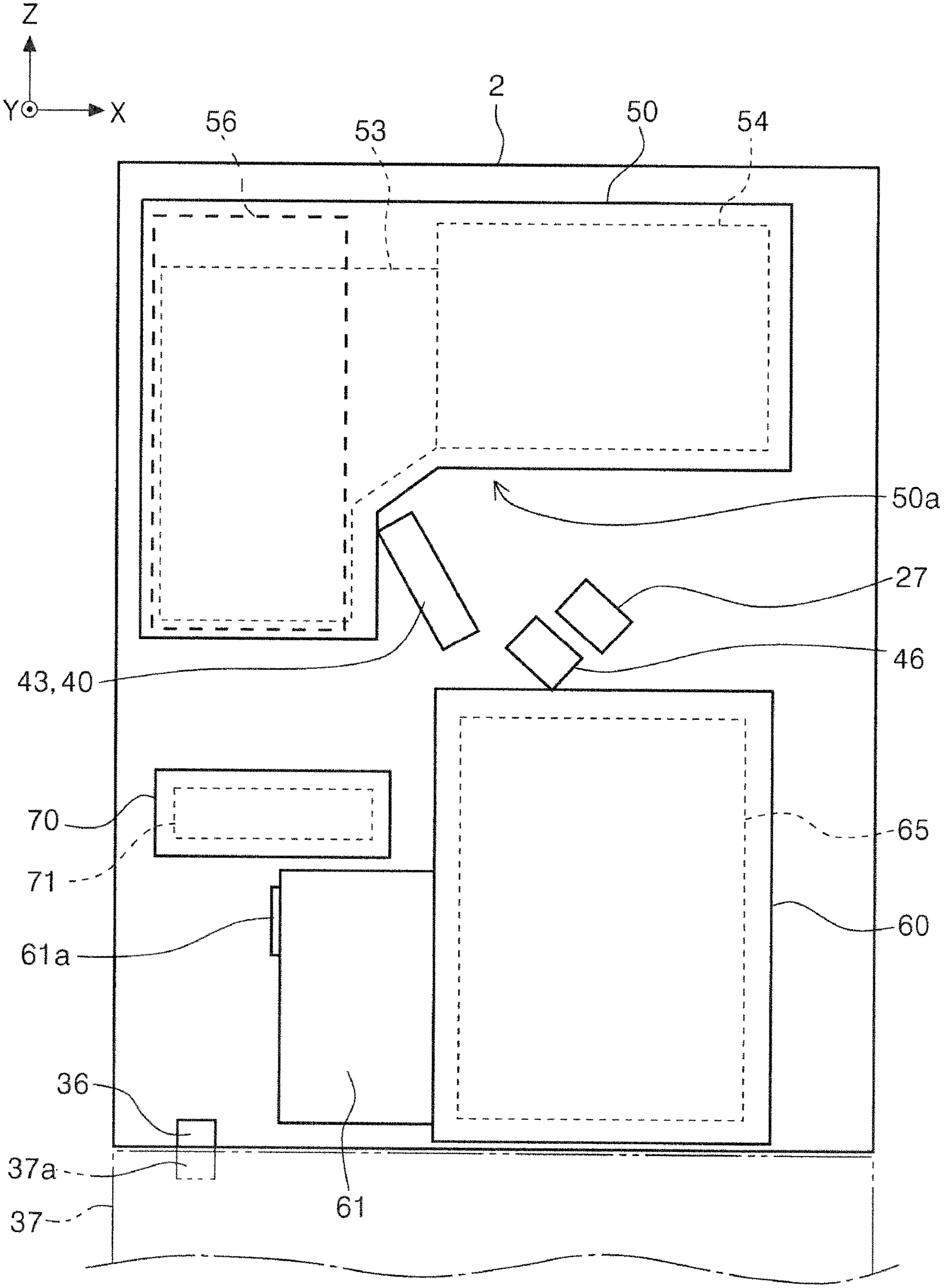
FIG. 7 is a diagram schematically illustrating a positional relationship between respective constituting parts when components on a back side of the apparatus are viewed from the front.

The electric unit 50 has an outer shell formed by a metal case, and includes a main substrate 53 and a sub-substrate 54 formed therein as illustrated in FIG. 7.

The power supply unit 60 has an outer shell formed by a metal case, and includes a power supply substrate 65 formed therein as illustrated in FIG. 7.

The high-voltage unit 70 has an outer shell formed by a metal case, and includes a high-voltage substrate 71 formed therein as illustrated in FIG. 7. In all the substrates described above, substrate surfaces thereof are provided in parallel to the back covers 25A and 25*b*, that is, in parallel to the X-Z plane. In other words, all the substrates are orthogonal to the Y-axis direction which is the moving direction of the wiper portion 41. However, each substrate is not necessarily orthogonal to the Y-axis direction, and may intersect the Y-axis direction.

Each substrate described above is located at a center position of each unit in the Y-axis direction or located in the −Y direction from the center position.

The main substrate 53 of the electric unit 50 includes a microcontroller or memory (not illustrated), and controls entire printer 1. The sub-substrate 54 of the electric unit 50 includes a line circuit or the like for driving each motor, and is electrically coupled to the main substrate 53 by a coupling section (not illustrated).

In addition, the electric unit 50 includes a communication unit 56 (see FIG. 7) including various modules for facsimile communication or communication with an external network. The communication unit 56 is electrically coupled to the main substrate 53 by the coupling section (not illustrated).

The power supply substrate 65 of the power supply unit 60 includes an electric component (not illustrated) adjusting a voltage of power supplied to each constituting parts of the printer 1 or a heat sink (not illustrated) promoting heat dissipation.

Further, the high-voltage substrate 71 of the high-voltage unit 70 includes an electric component for controlling charging of the transport belt 7.

The main body coupling portion 36 exposed due to removal of the back cover 25B is a part for electrically coupling to a unit coupling portion 37*a* that is provided on an extension unit 37 as illustrated in FIG. 7. The extension unit 37 is attachable to/detachable from the lower portion of the apparatus main body 2, and includes a medium cassette (not illustrated) and a feeding mechanism for sending out the medium from the medium cassette.

The main body coupling portion 36 is disposed in a space provided on a left side of the inlet unit 61 in a front view as viewed from the back side of the apparatus. As a result, by removing the back cover 25B, it is possible to perform maintenance such as exchange of the main body coupling portion 36 without removing other parts.

Next, referring to FIG. 4, the electric unit 50 is rotatably provided on the apparatus main body 2 through hinge portions 51 and 52, and opened/closed by the rotation. In the present embodiment, two hinge portions 51 and 52 are provided in an end of the back surface of the apparatus in the +X direction at an interval in the Z-axis direction. A center of a rotation axis of the electric unit 50 is in parallel to the Z-axis direction by the hinge portions 51 and 52. When the electric unit 50 is opened from a closed state, the electric unit 50 is opened in a right direction, when viewed from a user located to face the back surface of the apparatus as illustrated by a change from FIG. 4 to FIG. 5.

The closed state of the electric unit 50 is held by the screws (not illustrated).

The center of the rotation axis of the electric unit 50 is not limited to being in parallel to the Z-axis direction, and may be, for example, in parallel to the X-axis direction. Further, the electric unit 50 may be provided so as to be attachable to/detachable from the apparatus main body 2 instead of being provided so as to be openable/closable with respect to the apparatus main body 2.

A support frame 62 is provided on a lower portion of the electric unit 50. The support frame 62 is rotatably provided through a hinge portion 63 that is provided on an end of the apparatus main body 2 in the +X direction, and opened/closed by the rotation.

An upper portion of the power supply unit 60 is coupled to the support frame 62. The hinge portion 64 is provided on the end of the apparatus main body 2 in the +X direction, and the power supply unit 60 is coupled to the hinge portion 64. When the power supply unit 60 and the support frame 62 are integrated with each other to rotate through the hinge portions 63 and 64, and opened from the closed state, the power supply unit 60 and the support frame 62 are opened in the right direction when viewed from a user located to face the back surface of the apparatus as illustrated by a change from FIG. 4 to FIG. 5. A center of a rotation axis of the power supply unit 60 and the support frame 62 is in parallel to the Z-axis direction by the hinge portions 63 and 64.

The closed state of the power supply unit 60 and the support frame 62 are held by the screws (not illustrated).

The center of the rotation axis of the power supply unit 60 and the support frame 62 is not limited to being in parallel to the Z-axis direction, and may be, for example, in parallel to the X-axis direction. Further, the power supply unit 60 and the support frame 62 may be provided so as to be attachable to/detachable from the apparatus main body 2, instead of being provided so as to be openable/closable with respect to the apparatus main body 2.

Further, the power supply unit 60 and the support frame 62 may not be coupled to each other.

The high-voltage unit 70 is attached to the apparatus main body 2 with the screws (not illustrated). However, the high-voltage unit 70 may be rotatably provided on the apparatus main body 2 in the same manner as the electric unit 50 or the power supply unit 60. The center of the rotation axis in this case may be in parallel to the Z-axis direction in the same manner as the electric unit 50, or in parallel to the X-axis direction. When the high-voltage unit 70 is rotatably provided on the apparatus main body 2, a configuration that the center of the rotation axis is in parallel to the Z-axis direction and the high-voltage unit 70 is opened in a left direction when viewed from the user located to face the back surface of the apparatus is considered.

The electric unit 50 is formed in a shape in which a right lower edge is cut out in a front view as viewed from the back side of the apparatus as illustrated in FIG. 7, and a portion thereof is hereinafter referred to as a cutout portion 50*a*. As illustrated in FIG. 4, the wiping mechanism 40 is disposed on the cutout portion 50*a*. In addition, at least part of the wiper drive motor 46 and at least part of the head lifting motor 27 are disposed on the cutout portion 50*a*. As a result, it is possible to suppress an increase in size of the apparatus in accordance with installation of the wiper drive motor 46 and the head lifting motor 27.

By removing the back cover 25A, the wiping mechanism 40, the wiper drive motor 46, and the head lifting motor 27 are exposed. As a result, the back cover 25A is removed, such that it is possible to perform an exchange operation of the wiper drive motor 46 or head lifting motor 27 without removing other parts.

The coupling unit 43 is first exposed from the wiping mechanism 40 by removing the back cover 25A. The coupling unit 43 can be removed from the apparatus main body 2 by removing the screws (not illustrated). The wiper portion 41 is exposed by removing the coupling unit 43. The wiper portion 41 can be removed from the apparatus main body 2 by removing the screws (not illustrated). As a result, it is possible to exchange the wiper 42.

In the present embodiment, the coupling unit 43 can be removed and then the wiper portion 41 can be removed, while the electric unit 50 and the power supply unit 60 are closed. However, for example, by opening the electric unit 50, the coupling unit 43 or the wiper portion 41 can be removed.

Figure 8:
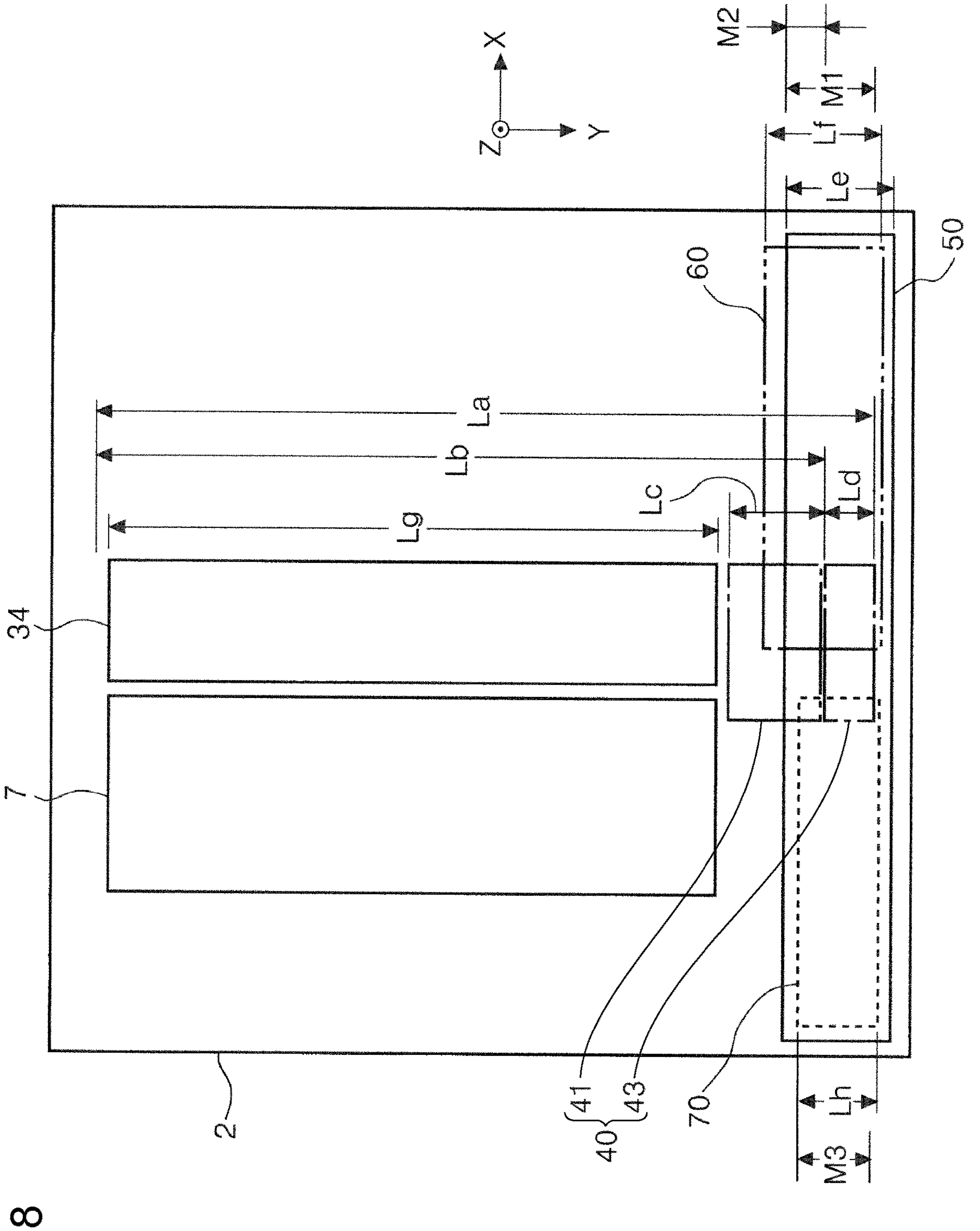
FIG. 8 is a diagram schematically illustrating the positional relationship between respective constituting parts when the apparatus is viewed in plan from above the apparatus.

Next, a configuration for suppressing the dimension of the apparatus in the moving direction of the wiper portion 41 will be mainly described with reference to FIGS. 7 and 8. In FIG. 8, the electric unit 50 is indicated by a solid line, and the power supply unit 60 is indicated by an alternate long and two short dashes line. In addition, the wiper portion 41 and the coupling unit 43, that is, the wiping mechanism 40 are indicated by an alternate long and short dash line. In addition, the high-voltage unit 70 is indicated by a broken line.

As illustrated in FIG. 8, part of the electric unit 50 overlaps part of the power supply unit 60 in the moving direction of the wiper portion 41. The part of the electric unit 50 and the part of the power supply unit 60 overlap part of the wiping mechanism 40. As a result, the dimension of the apparatus in the moving direction of the wiper portion 41 can be suppressed, and the size of the apparatus can be reduced.

In the present embodiment, since the moving direction of the wiper portion 41 is the Y-axis direction, that is, the apparatus depth direction, the dimension in the apparatus depth direction can be suppressed.

More specifically, an area La illustrated in FIG. 8 represents an area occupied by the wiping mechanism 40 in the Y-axis direction. The area La includes an area occupied by the wiper portion 41 (an area Lb) in accordance with the movement of the wiper portion 41. In other words, the area Lb corresponds to the movement region of the wiper portion 41. Further, an area Lc is an area occupied by the wiper portion 41 in the Y-axis direction when the wiper portion 41 is located at the home position. Further, an area Ld is an area occupied by the coupling unit 43 constituting the wiping mechanism 40 in the Y-axis direction.

Further, an area Le represents an area occupied by the electric unit 50 in the Y-axis direction, and an area Lf represents an area occupied by the power supply unit 60 in the Y-axis direction.

As illustrated in FIG. 8, part of the area Le overlaps part of the area Lf. That is, the part of the electric unit 50 overlaps the part of the power supply unit 60 in the moving direction of the wiper portion 41.

The part of the area Le and the part of the area Lf overlap part of the area La. That is, the part of the electric unit 50 and the part of the power supply unit 60 overlap part of the wiping mechanism 40. An area in which three of the wiping mechanism 40, the electric unit 50, and the power supply unit 60 overlap each other in the Y-axis direction is indicated by reference symbol M1.

In the present embodiment, the part of the electric unit 50 overlaps the part of the power supply unit 60 in the moving direction of the wiper portion 41. However, at least part of the electric unit 50 may overlap at least part of the power supply unit 60.

For example, the part of the electric unit 50 may overlap the entirety of the power supply unit 60, or the entirety of the electric unit 50 may overlap at least part of the power supply unit 60.

Alternatively, when a dimension of the electric unit 50 is the same as a dimension of the power supply unit 60 in the moving direction of the wiper portion 41, the entirety of the electric unit 50 may overlap the entirety of the power supply unit 60.

In the present embodiment, the part of the electric unit 50 and the part of the power supply unit 60 overlap the part of the wiping mechanism 40 in the moving direction of the wiper portion 41. However, at least part of the electric unit 50 and at least part of the power supply unit 60 may overlap the part of the wiping mechanism 40 in the moving direction of the wiper portion 41.

For example, the entirety of the electric unit 50 and the part of the power supply unit 60 may overlap the part of the wiping mechanism 40.

Alternatively, the part of the electric unit 50 and the entirety of the power supply unit 60 may overlap the part of the wiping mechanism 40.

Alternatively, the entirety of the electric unit 50 and the entirety of the power supply unit 60 may overlap the part of the wiping mechanism 40.

The wiper portion 41 can move to the end in the +Y direction, that is, the home position, which is a position where the wiper portion 41 is coupled to the coupling unit 43, and to a wiping region where the ink ejection surface 35 is wiped. The wiping region corresponds to an area of the line head 34 occupied in the Y-axis direction, and is represented by reference symbol Lg in FIG. 7.

In the present embodiment, when the wiper portion 41 is located at the home position, the part of the electric unit 50 and the part of the power supply unit 60 overlap part of the wiper portion 41. When the wiper portion 41 is located at the home position, an area where the part of the electric unit 50 and the part of the power supply unit 60 overlap the part of the wiper portion 41 is represented by reference symbol M2.

However, not limited to this, when the wiper portion 41 is located at the home position, at least part of the electric unit 50 may overlap at least part of the wiper portion 41. In this case, the expression "at least part" may mean either "part" or "entirety".

Alternatively, when the wiper portion 41 is located at the home position, at least part of the power supply unit 60 may overlap at least part of the wiper portion 41. Also in this case, the expression "at least part" may mean either "part" or "entirety".

Alternatively, when the wiper portion 41 is located at the home position, at least part of the electric unit 50 and at least part of the power supply unit 60 may overlap at least part of the wiper portion 41. Also in this case, the expression "at least part" may mean either "part" or "entirety".

The back covers 25A and 25B forming the back surface of the apparatus can be provided so as to be attachable to/detachable from the apparatus main body 2, and the electric unit 50 and the power supply unit 60 are exposed by removing or opening the back covers 25A and 25B. As a result, the maintainability of the electric unit 50 and the power supply unit 60 is improved.

The back covers 25A and 25B may be provided so as to be openable/closable with respect to the apparatus main body 2.

In the present embodiment, since the electric unit 50 and the power supply unit 60 are provided so as to be openable/closable with respect to the apparatus main body 2, a storage space for the electric unit 50 or the power supply unit 60 is not required during a maintenance operation in comparison to a configuration in which the electric unit 50 or the power supply unit 60 is removed, such that an operation efficiency for the maintenance is improved.

In the present embodiment, part of the high-voltage unit 70 overlaps the part of the wiping mechanism 40 in the moving direction of the wiper portion 41. In the present embodiment, an area where the part of the high-voltage unit 70 and the part of the wiping mechanism 40 overlap each other in the moving direction of the wiper portion 41 is represented by area M3 in FIG. 7.

As a result, the dimension of the apparatus in the moving direction of the wiper portion 41 can be suppressed in accordance with the disposition of the high-voltage unit 70, and in the present embodiment, a dimension in the apparatus depth direction can be suppressed.

In the present embodiment, the part of the high-voltage unit 70 and the part of the wiping mechanism 40 overlap each other in the moving direction of the wiper portion 41. However, the entirety of the high-voltage unit 70 and the part of the wiping mechanism 40 may overlap each other in the moving direction of the wiper portion 41.

Figure 9:
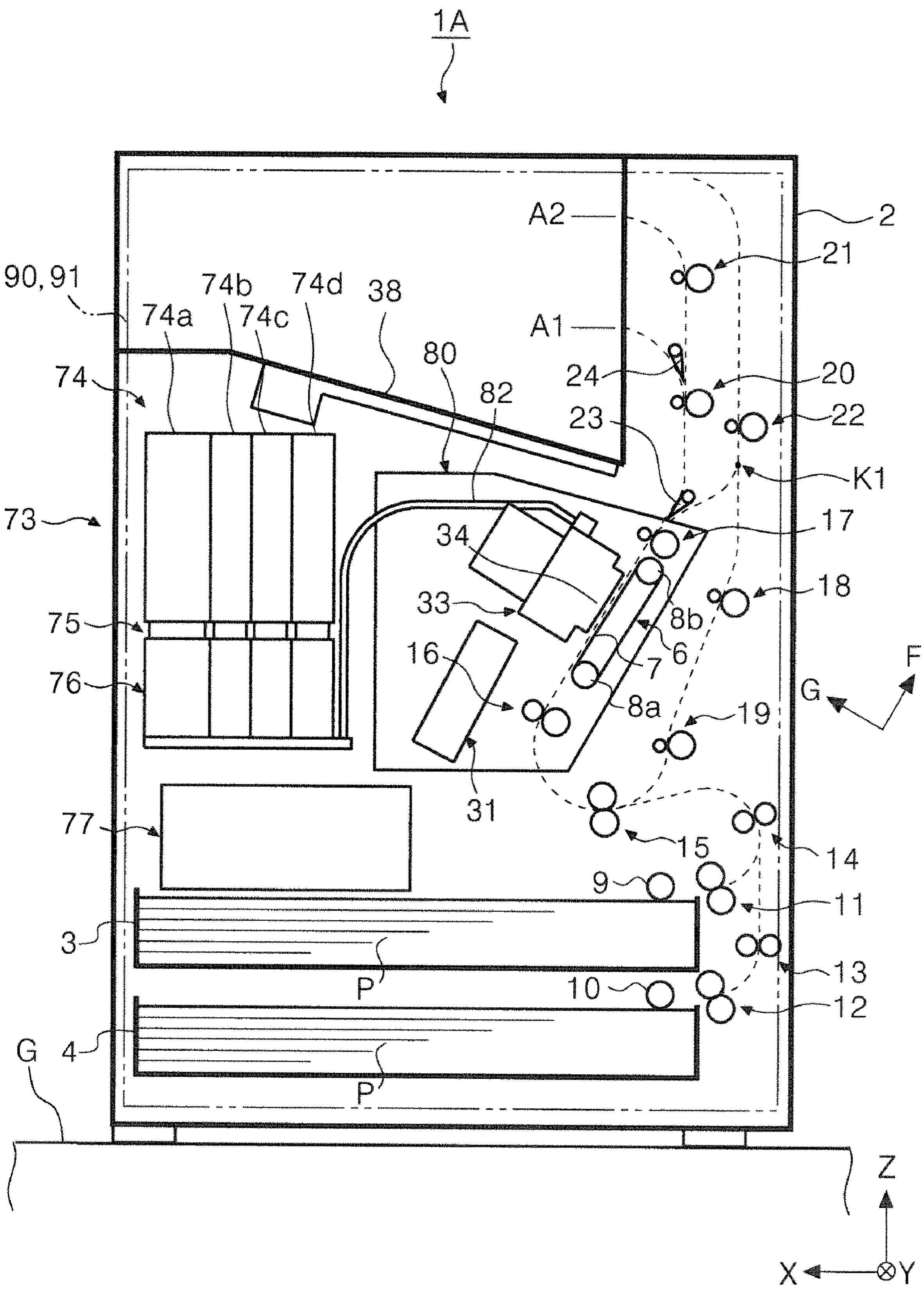
FIG. 9 is a diagram illustrating a medium transport path of a printer according to another embodiment.
Figure 10:
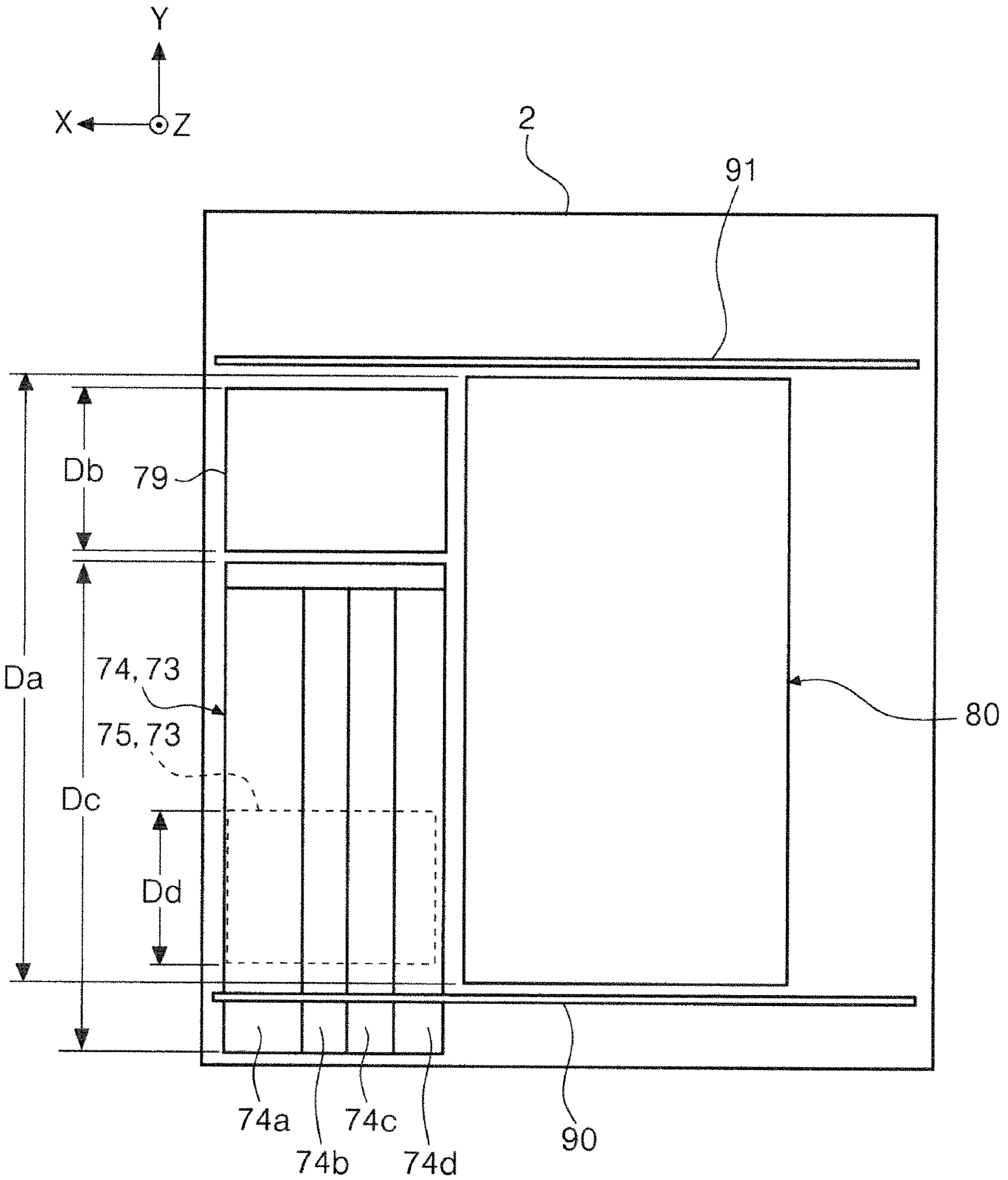
FIG. 10 is a diagram schematically illustrating a positional relationship between respective constituting parts when the printer according to another embodiment is viewed in plan.
Figure 11:
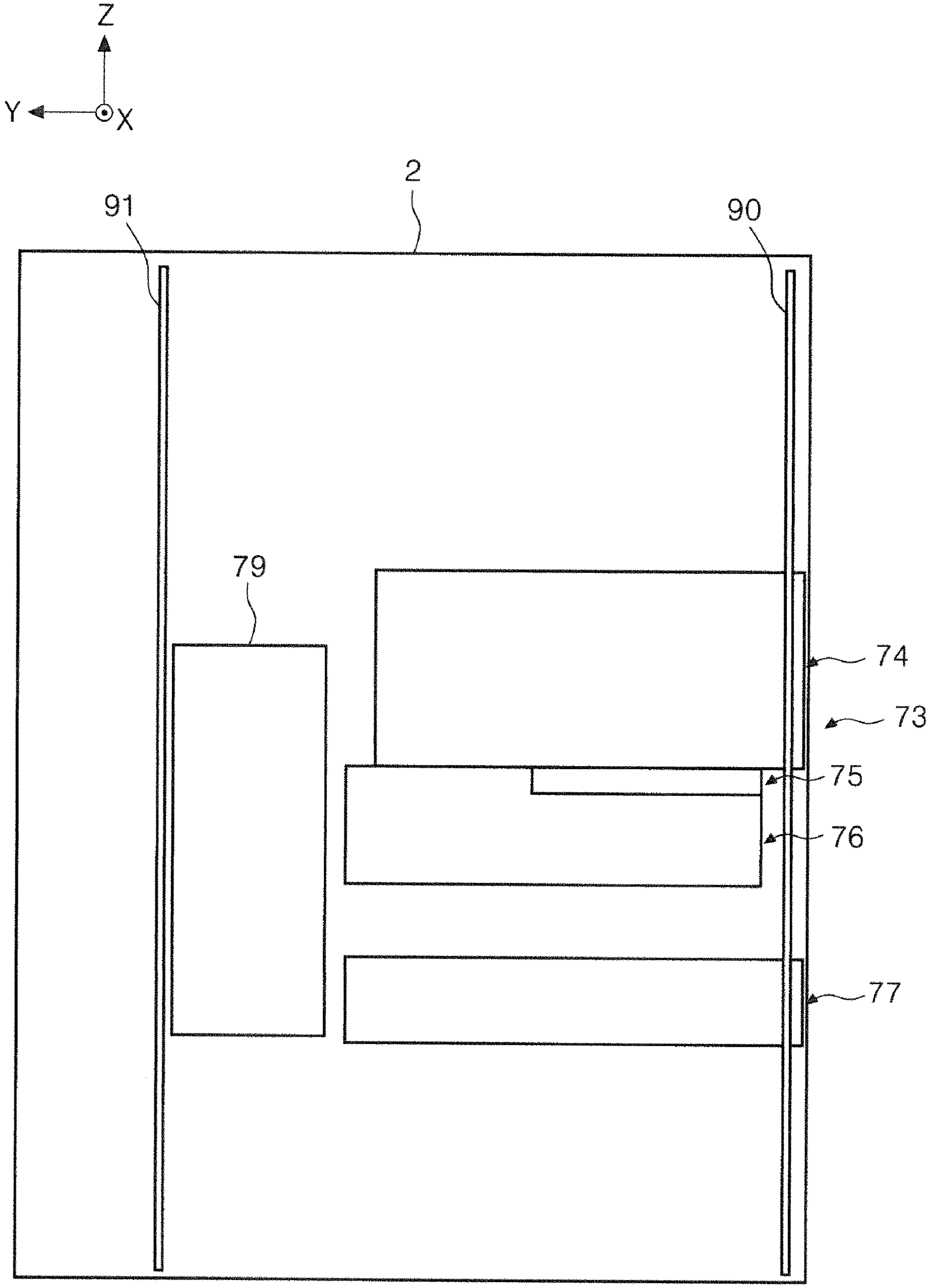
FIG. 11 is a diagram schematically illustrating a positional relationship between respective constituting parts when the printer according to the other embodiment is viewed from a +X direction.

Next, a configuration of a printer 1A according to another embodiment will be described with reference to FIGS. 9 to 11. The same components as those already described in FIGS. 9 to 11 are designated by the same reference numerals, and duplicate description will be omitted. Although the components such as the electric unit 50 or power supply unit 60 described with reference to FIGS. 7 and 8 are not illustrated in FIGS. 10 and 11, the present embodiment also has components described with reference to FIGS. 7 and 8, and dispositions thereof are also the same as those in FIGS. 7 and 8. However, the components described with reference to FIGS. 7 and 8 are not necessarily essential in the present embodiment.

Reference numeral 80 in FIG. 9 represents a transport unit. The transport unit 80 is a unit including the head unit 33, the belt unit 6, and the cap carriage 31, and is attachable to/detachable from a front frame 90 and a rear frame 91 (see FIGS. 10 and 11) constituting a base body of the apparatus main body 2.

The front frame 90 and the rear frame 91 illustrated in FIGS. 10 and 11 are a pair of frames, form a frame surface in parallel to the X-Z plane, and are disposed to face each other with the transport unit 80 interposed therebetween in the moving direction (Y-axis direction) of the wiper portion 41.

Returning to FIG. 9, an ink supply unit 73, a maintenance box 77, and a maintenance unit 79 (see FIG. 10) are disposed in the +X direction with respect to the transport unit 80.

The ink supply unit 73 includes an ink accommodating portion 74 accommodating the ink, a mounting portion 75 on which the ink accommodating portion 74 can be mounted, and a reservoir tank 76 storing the ink supplied from the ink accommodating portion 74, as a part located between the ink accommodating portion 74 and the line head 34 in an ink flow channel. The reservoir tank 76 is an example of a liquid storing portion. The ink accommodating portion 74 includes a plurality of ink cartridges as represented by reference symbols 74*a*, 74*b*, 74*c*, and 74*d*, respectively. Each ink cartridge is an example of a liquid container. The mounting portion 75 and the reservoir tank 76 are provided to correspond to each of the plurality of ink cartridges. Each ink cartridge can be attached to/detached from the apparatus front side (−Y direction).

The ink stored in the reservoir tank 76 is supplied to the line head 34 through an ink tube 82. The ink tube 82 is also provided to correspond to each of the plurality of ink cartridges. As such, the ink supply unit 73 is provided adjacent to the transport unit 80, such that it is possible to shorten a length of the ink tube 82.

The maintenance box 77 is provided below the ink supply unit 73. The maintenance box 77 is coupled to the cap carriage 31 by an ink tube (not illustrated), and the ink (waste ink) ejected from the line head 34 to the cap carriage 31 is sent to the maintenance box 77 and stored. In addition, distilled water is stored in the maintenance box 77, and the distilled water is sent to the cap carriage 31 for moisturizing at a necessary timing.

The maintenance box 77 can be attached to/detached from the apparatus front side (−Y direction).

The ink accommodating portion 74 and the maintenance box 77 protrude to the apparatus front side (−Y direction) from the mounting portion 75 and the reservoir tank 76. As a result, an attachment/detachment operation of each ink cartridge constituting the ink accommodating portion 74 and the maintenance box 77 can be facilitated.

As illustrated in FIGS. 10 and 11, the maintenance unit 79 is disposed in the +Y direction with respect to the ink supply unit 73, that is, on an apparatus rear side. The maintenance unit 79 includes a pump (not illustrated) which is a part where the ink (waste ink) ejected from the line head 34 to the cap carriage 31 is collected and sent to the maintenance box 77, or a part where the distilled water is sent from the maintenance box 77 to the cap carriage 31. The maintenance unit 79 is an example of a waste liquid collecting portion.

The maintenance unit 79 can be accessed by opening the opening/closing cover (not illustrated) provided on a side of the apparatus main body 2 in the +X direction. As a result, even when the side of the apparatus main body 2 in the +Y direction is installed close to a wall, the maintenance unit 79 can be easily accessed.

In the above configuration, as illustrated in FIG. 10, part of the transport unit 80 and the entirety of the maintenance unit 79 overlap each other in the moving direction (Y-axis direction) of the wiper portion 41. In FIG. 10, an area Da represents an area occupied by the transport unit 80 in the Y-axis direction, and an area Db represents an area occupied by the maintenance unit 79 in the Y-axis direction. In the present embodiment, the entire area Db belongs to the area Da. As a result, the dimension of the apparatus in the Y-axis direction, that is, in the moving direction of the wiper portion 41 can be suppressed, and the size of the apparatus can be reduced.

At least part of the transport unit 80 and at least part of the maintenance unit 79 may overlap each other, and in this case, the expression "at least part" may mean either "part" or "entirety".

An area Dd illustrated in FIG. 10 represents an area occupied by the mounting portion 75 in the Y-axis direction. As illustrated in FIG. 10, the entirety of the mounting portion 75 and the entirety of the maintenance unit 79 are within the area of the transport unit 80 in the Y-axis direction. As a result, the dimension of the apparatus in the Y-axis direction, that is, in the moving direction of the wiper portion 41 can be suppressed, and the size of the apparatus can be reduced.

An area Dc illustrated in FIG. 10 represents an area occupied by the ink supply unit 73 in the Y-axis direction. As illustrated in FIG. 10, part of the ink supply unit 73 and the entirety of the maintenance unit 79 overlap the part of the transport unit 80 in the Y-axis direction. As a result, the dimension of the apparatus in the Y-axis direction, that is, in the moving direction of the wiper portion 41 can be suppressed, and the size of the apparatus can be reduced.

Since the ink supply unit 73 and the maintenance unit 79 are arranged along the Y-axis direction (see also FIG. 11), the dimension of the apparatus in the X-axis direction, which is a direction intersecting the Y-axis direction, can be suppressed, and the size of the apparatus can be reduced.

At least part of the ink supply unit 73 and at least part of the maintenance unit 79 may overlap at least part of the transport unit 80, and in this case, the expression "at least part" may mean either "part" or "entirety".

The apparatus main body 2 includes the front frame 90 and the rear frame 91 for supporting the transport unit 80, and as illustrated in FIG. 10, the entirety of the maintenance unit 79 is provided inside the front frame 90 and the rear frame 91. As a result, it is not necessarily to provide a hole passing through the maintenance unit 79 in the front frame 90 and the rear frame 91, particularly, the rear frame 91, such that deterioration in rigidity of the front frame 90 and the rear frame 91 can be prevented.

As illustrated in FIG. 10, the part of the transport unit 80 and the part of the ink supply unit 73 overlap each other in Y-axis direction. As a result, the dimension of the apparatus in the Y-axis direction, that is, in the moving direction of the wiper portion 41 can be suppressed, and the size of the apparatus can be reduced.

At least part of the transport unit 80 and at least part of the ink supply unit 73 may overlap each other, and in this case, the expression "at least part" may mean either "part" or "entirety".

The present disclosure is not limited to the aforementioned embodiments. Various modifications can be made within the scope of the disclosure defined by the appended claims, and such modifications should be included in the scope of the present disclosure.

What is claimed is:

1. A liquid ejecting apparatus comprising:
a liquid ejecting head ejecting a liquid to a medium;
a wiping mechanism wiping a liquid ejection surface of the liquid ejecting head and including a wiper portion that wipes the liquid ejection surface by moving in a direction along the liquid ejection surface;
an electric portion including a substrate, the electric portion being a part related to control of the apparatus; and
a power supply portion as a power supply source, wherein
the moving direction of the wiper portion is a direction intersecting a surface of the substrate,
at least part of the electric portion overlaps at least part of the power supply portion in the moving direction of the wiper portion, and
the at least part of the electric portion and the at least part of the power supply portion overlap part of the wiping mechanism in the moving direction of the wiper portion.

2. The liquid ejecting apparatus according to claim 1, wherein
the wiper portion is configured to move to a home position and a wiping region where the liquid ejection surface is wiped, and
when the wiper portion is located at the home position, the at least part of the electric portion overlaps at least part of the wiper portion in the moving direction of the wiper portion, the at least part of the power supply portion overlaps the at least part of the wiper portion in the moving direction of the wiper portion, or the at least part of the electric portion and the at least part of the power supply portion overlap the at least part of the wiper portion in the moving direction of the wiper portion.

3. The liquid ejecting apparatus according to claim 1, wherein the moving direction of the wiper portion is an apparatus depth direction.

4. The liquid ejecting apparatus according to claim 3, wherein a back cover forming a back surface of the apparatus is configured to be attached to/detached from or opened/closed with respect to an apparatus main body, and the electric portion and the power supply portion are exposed by removing or opening the back cover.

5. The liquid ejecting apparatus according to claim 4, wherein the electric portion and the power supply portion are configured to be opened/closed with respect to the apparatus main body.

6. The liquid ejecting apparatus according to claim 1, further comprising:

a transport belt transporting the medium and provided at a position facing the liquid ejecting head; and a high-voltage portion handling a higher voltage than the electric portion, the high-voltage portion being a part for controlling charging of the transport belt, wherein at least part of the high-voltage portion overlaps the part of the wiping mechanism in the moving direction of the wiper portion.

7. The liquid ejecting apparatus according to claim 1, wherein the electric portion includes a communication portion for communicating with an external device.

8. The liquid ejecting apparatus according to claim 1, further comprising:

a wiper drive motor as a power source for moving the wiper portion, wherein when viewed from the moving direction of the wiper portion, a cutout portion is formed in the electric portion, and at least part of the wiper drive motor is disposed on the cutout portion.

9. The liquid ejecting apparatus according to claim 1, further comprising:

a transport unit transporting the medium; and a waste liquid collecting portion collecting a waste liquid ejected from the liquid ejecting head.

10. The liquid ejecting apparatus according to claim 9, wherein at least part of the transport unit overlaps at least part of the waste liquid collecting portion in the moving direction of the wiper portion.

11. The liquid ejecting apparatus according to claim 9, further comprising:

a mounting portion on which a liquid container for accommodating the liquid supplied to the liquid ejecting head is configured to be mounted, wherein an entirety of the mounting portion and an entirety of the waste liquid collecting portion are within an area of the transport unit in the moving direction of the wiper portion.

12. The liquid ejecting apparatus according to claim 9, further comprising:

a liquid supply unit supplying the liquid to the liquid ejecting head, wherein the liquid supply unit includes a mounting portion on which a liquid container for accommodating the liquid supplied to the liquid ejecting head is configured to be mounted, and a liquid storing portion storing the liquid supplied from the liquid container, the liquid storing portion being a part located between the liquid container and the liquid ejecting head in a flow channel of the liquid, at least part of the liquid supply unit and at least part of the waste liquid collecting portion overlap at least part of the transport unit in the moving direction of the wiper portion, and the liquid supply unit and the waste liquid collecting portion are arranged along the moving direction of the wiper portion.

13. The liquid ejecting apparatus according to claim 9, further comprising:

a pair of frames supporting the transport unit and disposed to face each other in the moving direction of the wiper portion with the transport unit interposed between the pair of frames, wherein an entirety of the waste liquid collecting portion is provided inside the pair of frames.

14. The liquid ejecting apparatus according to claim 1, further comprising:

a transport unit transporting the medium; and a liquid supply unit supplying the liquid to the liquid ejecting head, wherein the liquid supply unit includes a mounting portion on which a liquid container for accommodating the liquid supplied to the liquid ejecting head is configured to be mounted, and a liquid storing portion storing the liquid supplied from the liquid container, the liquid storing portion being a part located between the liquid container and the liquid ejecting head in a flow channel of the liquid, and at least part of the transport unit overlaps at least part of the liquid supply unit in the moving direction of the wiper portion.

* * * * *